United States Patent [19]

Rijlaarsadam

[11] Patent Number: 5,161,313
[45] Date of Patent: Nov. 10, 1992

[54] TRACKING, MEASURING AND CALCULATING INSTRUMENT FOR THE DETERMINATION OF LENGTHS, AREAS, PERIPHERIES AND VOLUMES

[76] Inventor: Cornelis E. Rijlaarsadam, Julianastraat 48, Alphen Aan De Rijn, 2405 CJ, Netherlands

[21] Appl. No.: 617,912

[22] Filed: Nov. 14, 1990

Related U.S. Application Data

[63] Continuation of Ser. No. 069,903, Jul. 6, 1987, abandoned, which is a continuation of Ser. No. 815,899, Jan. 3, 1986, abandoned.

[30] Foreign Application Priority Data

May 3, 1984 [NL] Netherlands ............ 8401419

[51] Int. Cl.$^5$ .............................. G01B 3/12
[52] U.S. Cl. ....................... 33/773; 33/779; 33/780
[58] Field of Search ............ 33/773, 779, 780, 781, 33/782; 364/562

[56] References Cited

U.S. PATENT DOCUMENTS

| | | | |
|---|---|---|---|
| 2,110,757 | 3/1938 | Clarke | 33/142 |
| 2,294,566 | 9/1942 | Malm et al. | 33/772 |
| 3,012,328 | 12/1961 | Henson et al. | 33/780 |
| 3,494,039 | 2/1970 | Porter | 33/142 |
| 3,497,959 | 3/1970 | Englesman | 364/562 |
| 3,688,410 | 9/1972 | Zeidler | 33/773 |
| 3,742,243 | 6/1973 | Gamble | 307/106 |
| 4,163,323 | 8/1979 | Bud | 33/780 |
| 4,253,239 | 3/1981 | Houck | 33/141 R |
| 4,377,850 | 3/1983 | Simpson | 33/142 |
| 4,383,301 | 5/1983 | Morita et al. | 364/562 |

FOREIGN PATENT DOCUMENTS

| | | | |
|---|---|---|---|
| 2751620 | 5/1978 | Fed. Rep. of Germany | 33/141 R |
| 3025686 | 2/1982 | Fed. Rep. of Germany | 33/141 E |
| 36726 | 3/1980 | Japan | 33/141 R |
| 58-101105 | 7/1983 | Japan . | |
| 422611 | 1/1935 | United Kingdom | 33/141 E |
| 785054 | 10/1957 | United Kingdom | 33/141 R |
| 2115139 | 9/1983 | United Kingdom . | |

OTHER PUBLICATIONS

Mechanix Illustrated, "Electronic Ruler", Sep. 1979, p. 148.

Primary Examiner—Thomas B. Will
Attorney, Agent, or Firm—Kenyon & Kenyon

[57] ABSTRACT

A hand-held instrument for measuring and calculating length, areas, peripheries and volumes is disclosed. The instrument has a housing with a tapered end giving it the overall appearance of a writing instrument. The instrument has a tracking wheel which follows a line or a curve through a revolution of the wheel. The wheel revolutions are then transmitted via an apertured shaft to an opto-electronic device which reads the angular position of the shaft and converts the wheel revolutions into electrical pulses. The pulses are inputed to a calculator which calculates length, surface areas, peripheries and volumes. A display window displays the calculator results. A caster is also disclosed to facilitate measuring curves.

4 Claims, 5 Drawing Sheets

5,161,313

TRACKING, MEASURING AND CALCULATING INSTRUMENT FOR THE DETERMINATION OF LENGTHS, AREAS, PERIPHERIES AND VOLUMES

This is a continuation of co-pending application Ser. No. 07/069,903 filed on Jul. 6, 1987 now abandoned which was a continuation of application Ser. No. 06/815,899 filed on Jan. 3, 1986 now abandoned.

This invention relates generally to a tracking, measuring and calculating instrument for the determination of lengths, areas, peripheries and volumes.

BACKGROUND OF THE INVENTION

It can be assumed that it is known that the length of roads on a map can be tracked by mechanical means, such as with a wheel, in such a way as to produce an analogue display on a scale of the number of revolutions made.

It is also known that micro-electronic techniques provide various means of receiving signals, of processing such signals, and of displaying calculated results.

The current invention concerns a tracking, measuring and calculating instrument for the determination of lengths, areas, peripheries and volumes that can by means of a tracking wheel follow lines on one, two or three-dimensional objects whereby the revolutions of the tracking wheel are converted into electrical pulses, following which these pulses are input to a calculator for calculating lengths, surface areas, peripheries or volumes, and is provided with a window for displaying the calculated results.

It is known from the brochure for the Olympia (probably registered as a trademark) MEC 81 that this instrument, in the form of a calculator, has the facility for extending from the short, left-hand side of the housing a sensor containing a tracking wheel with opto-coupling. By placing the MEC 81 instrument on the tracking wheel it is then possible for the user to trace maps or drawings whereby the sensed dimensions can be processed by the calculator. Via the built-in electronics it is also possible to perform a single conversion of the calculated result from the metric system to feet or inches.

Although the devices known in the prior art are usually sufficient to track and measure relatively straight lines, they have limited utility when used to follow and accurately measure curves, especially sharp curves. This is due mainly to the fact that the prior known instruments cannot be rotated in a user's fingers so that contact with the lines to be traced are adequately maintained while rotated. Thus, these instruments regularly miss the lines to be followed. This effect is even more pronounced when it is required that the prior known measuring instruments be moved from one hand to the other during operation. These disadvantages of the prior known measuring instruments often result in unintentional missed counts, leading inevitably to inaccurate measurements.

In addition, the method used for power supply makes the instrument dependent on two penlight batteries, the volume and weight of which result in a relatively bulky and relatively heavy instrument.

SUMMARY OF THE INVENTION

The current invention has the object of providing solutions to the problems specified and in consequence has the characteristic that all the functions of the instrument are combined in a single housing and that the housing is constructed in such a way that it is possible for the user with one hand to follow straight or curved lines on one, two or three-dimensional objects, with relative independence of the sharpness of the successive curves or the distance between them with a relatively high accuracy, whereby the calculator also disposes of programming means such that the calculations can be made for different scales and for several systems of units, for which purpose the instrument incorporates means of selection and similar devices and the instrument is provided with a conversion system for converting the movement of the tracking wheel into electrical pulses, and that a minimal quantity of electrical energy is required whereby the power supply used can be in the form of a relatively lightweight unit whereby the total weight, together with the proportions achieved, provide optimal ease of use that utilizes the currently-recognized principles of ergonometry.

BRIEF DESCRIPTION OF THE DRAWINGS

A number of versions of the invention will be described on the basis of the associated drawings. As an example

DETAILED DESCRIPTION OF THE DRAWINGS

Figure 1:
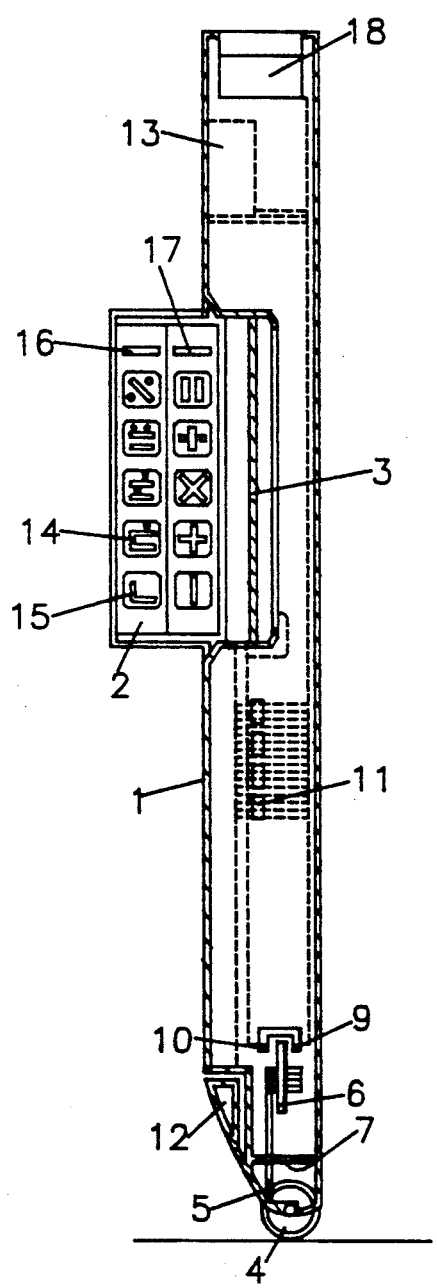
FIGS. 1A and 1B show a side view and plan of a longitudinal section.
Figure 1A:
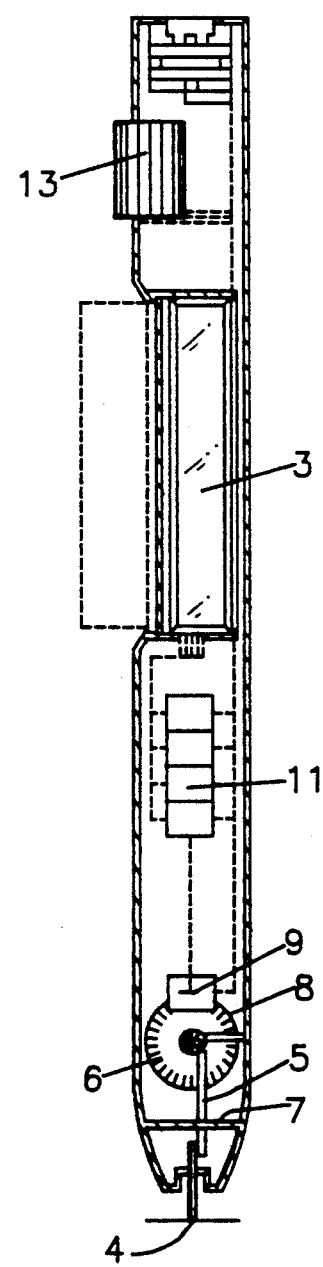

The figures will now be described in detail by number. FIGS. 1A and 1B show a side view and plan of a longitudinal section whereby the keyboard 2 can be opened and closed with respect to the housing 1. When the keyboard 2 is closed it shields the window 3 whereby the keyboard 2 and the window 3 are protected against moisture and dirt, providing safe storage in clothing or in a bag. In the point of the instrument is a tracking wheel 4, that can rotate axially with respect to the longitudinal axis of the instrument, and with which the surface of an object can be followed. This tracking wheel 4 is provided on one face with a gear wheel driving a shaft 5, which in turn drives the disk 6. The disk 6 is provided with a number of narrow slots 8 or holes at regular intervals. These slots 8 are designed to create a pulse train by interrupting a light beam coming from a light-generating element 9 and passing to a signal-receiving element 10 located on the other side of the disk 6, which converts the pulse train into an input signal for the calculator 11. With the opto-coupling system described above disk 6 can also incorporate other types of interrupter devices such as will be described under FIGS. 10 and 11. The calculator 11 can, for example, be in the form of a microprocessor consisting of one or more calculator chips as is known in calculator technology. The partition 7 provides sealing for the housing whereby elements within the housing are protected against moisture and dirt.

A start key 12, separately located for ergonometric reasons allows the user to start and to interrupt the measuring or tracking function whereby during measurements of different lines accidental movements of the tracking wheel do not lead to interference with the measurement results. This start key 12 is mounted on the upper surface and is located in the width in such a way that during the calculation of, for example, areas the length of the area to be measured is first measured by pressing the start key 12 and then after releasing key 12 entering the multiplication factor and then measuring the width after pressing key 12. When the '=' key is pressed, the calculated result is displayed in a window with, for example, digital symbols.

In the functional design of the calculator the basis was that calculation should be possible with predetermined systems of units and scales, i.e. that before or during or after the tracing operation an arithmetical factor can be selected whereby the calculations are performed in the required system of units and scale. To this end FIG. 1 shows a selector switch 13 with which a number of the most-common systems of units or scales are preselected. Variations can be obtained with the aid of the calculator.

The calculator to be used determines the division of the keyboard whereby the fix or selector key displays which scale or system of units has been selected. The function of this key 15 can be modified for different calculators. The narrow keys 16 and 17 serve to switch the electrical supply on and off. Keys 14, 14a and 14b control memory functions. Space 18 is intended for the power supply, batteries for example.

Figure 2:
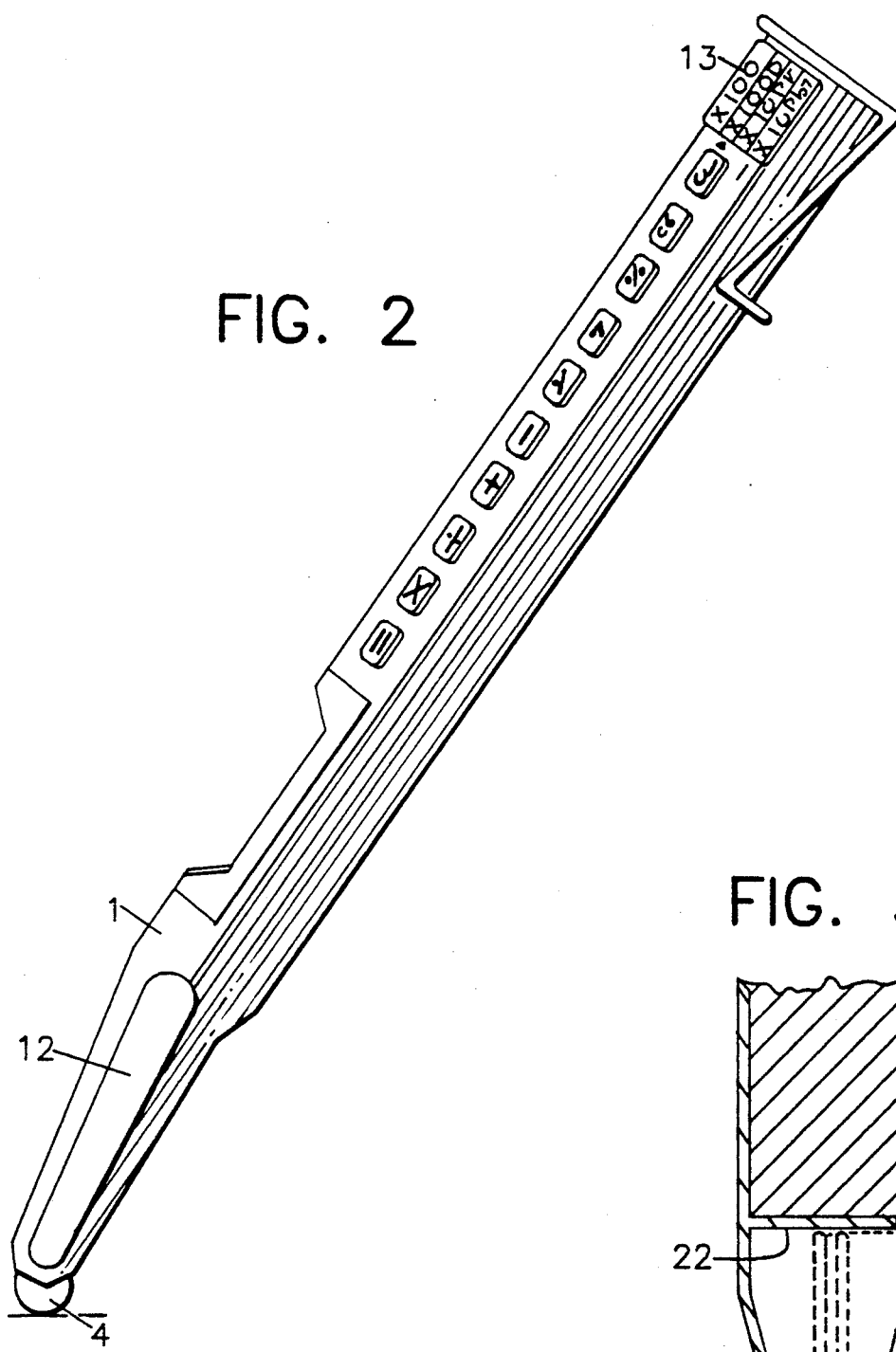
FIG. 2 shows the exterior of one version.

FIG. 2 shows the exterior of another version, in which the keys are arranged on the instrument for easy access, and of which the pen shape assists tracing of straight and curved lines. The illustration of the left-hand side of the instrument shows the keys for a number of arithmetical functions, whereas the non-illustrated right-hand side carries the numerals 0-9, the decimal sign and the memory functions. Equally applicable to the version shown in FIGS. 1A and 1B and to that in FIG. 2 is the fact that if different calculators are used modified keyboards and function keys will also be required.

Figure 3:
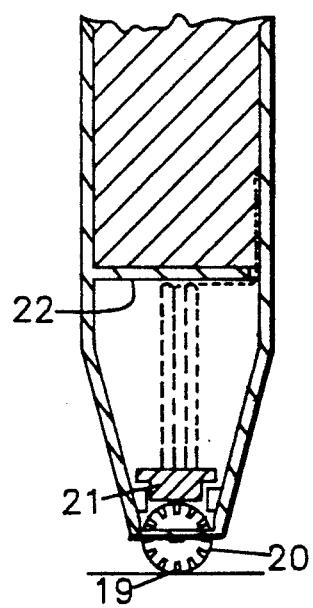
FIG. 3 shows a method whereby the calculator receives the necessary pulses via an electromagnetic generator.

FIG. 3 illustrates a method with which the pulses required by the calculator are amplified by an electro-magnetic generator, well known as the Hall generator. The tracking wheel 19 is fitted with small magnetic elements 20 which generate electrical pulses in the generator 21 when the tracking wheel 19 rotates. The impulses are fed to a contact on the partition 22 and from there transmitted to the calculator.

Figure 4:
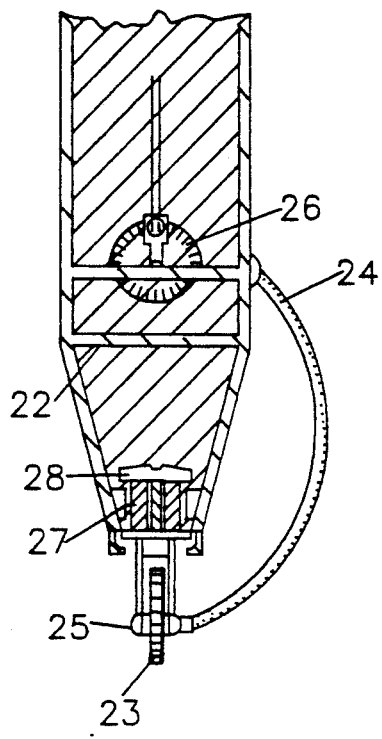
FIG. 4 shows one of the methods for providing a swivelling motion for the tracking wheel.

FIG. 4 shows one solution to the problem that can arise when the instrument has to trace complex curves, on a road map, for example, and curves of small radius. The swivel action of the tracking wheel offers the advantage that in addition to closer tracing of curves, the instrument can remain comfortably in the hand and that the keyboard and any window for the display of measured and calculated results remains better visible. The flexible shaft 24, attached at one end to the axis of rotation 25 of the tracking wheel 23, and at the other end to an input device on the housing for driving an interrupter 26. An incompletely circular shape of the locknut 28 ensures that the swivelling wheel 27 can swivel no more than 180 degrees, for example, whereby the flexible shaft is not impeded or damaged.

Figure 5:
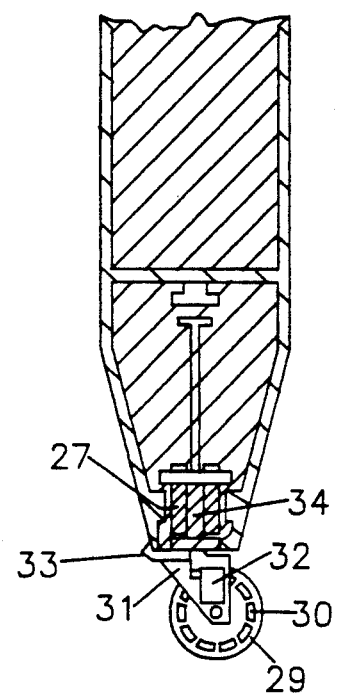
FIG. 5 gives an example in which the swivelling wheel is fitted with an electromagnetic generator.

FIG. 5 shows a swivelling wheel 27 in which an electromagnetic generator is mounted. This example of a swivelling wheel, in a version shown in side view, shows the tracking wheel 29 with the built-in magnetic elements 30. The generator 32 lies within the fork 31 of the swivel device 32, depending on the dimensions chosen, or on the face of the tracking wheel or above the tracking wheel in which case the magnetic elements are mounted further towards the periphery of the tracking wheel. Swivelling of the wheel can be blocked by sliding a locking device 33 against the serrations in the housing whereby measurements along a straight line are made easier. The vertical shaft 34 includes a device to prevent unlimited rotation of the swivelling wheel.

Figure 6:
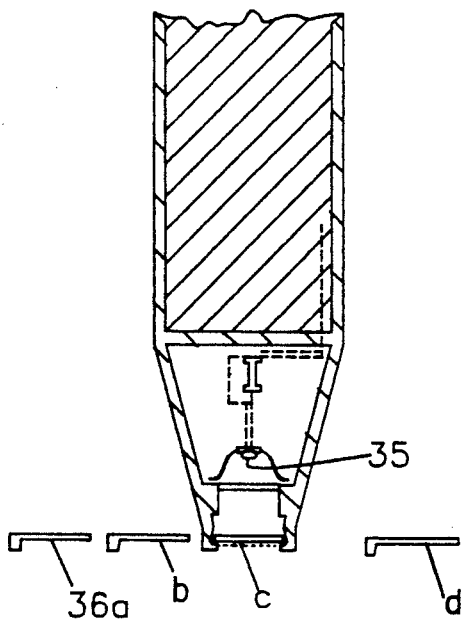
FIG. 6 shows a version with which pulses are obtained via optical interruption which can be produced independently of the instrument.

FIG. 6 shows a totally different method of recognizing pulses. Employing the fact that the swivelling wheels in FIGS. 4, 5 and 10a and 10b can be removed and replaced by, for example, an optical device 35 for converting light signals, for example, into useful pulses, and a distinction can be made between, for example, stripes of different colours on an object by mounting colour filters 36a–d. Invisible light can also be registered in this manner. The colour filters 36a–d are interchangeable and can be combined.

Figure 7:
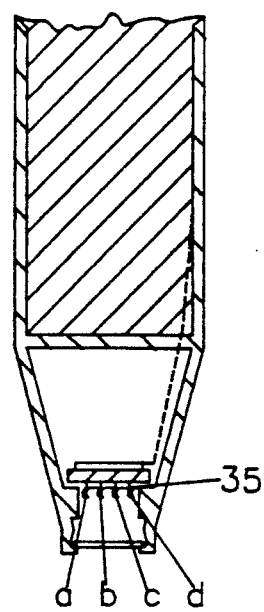
FIG. 7 shows that signals can be counted and registered with a combination of colour-sensitive sensors.

FIG. 7 shows an assembly of colour-sensitive sensors, which makes it possible for signals from, for example, differently-coloured areas on drawings, maps and objects to be differentiated and recognized. The colour-sensitive sensors consist of photoelectric cells 35 to which different colour filters have been applied by means of vapour deposition. These photocells with optical filters a, b, c and d are interchangeable. This method provides the possibility via colour detection of recognizing and processing distinctive information from objects or parts of objects with the calculator on the basis of their colour.

Figure 8A:
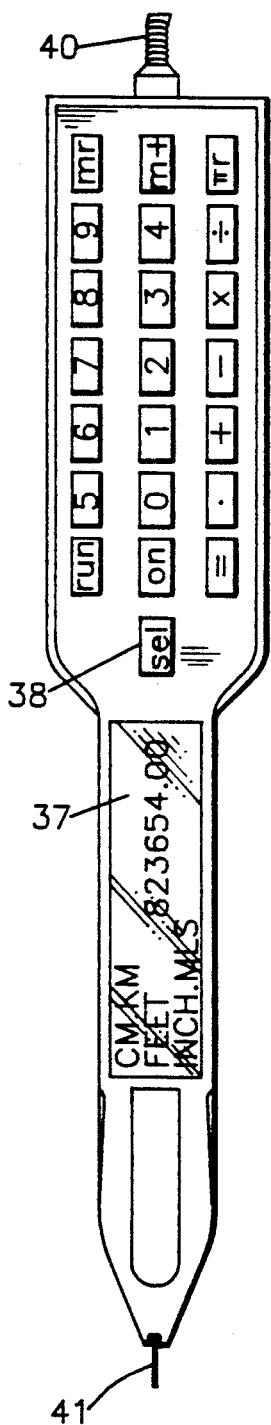
FIGS. 8a and 8b give a plan and side view of a version with a flat keyboard.
Figure 8B:
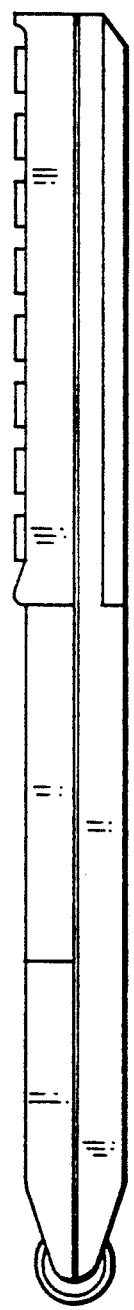

FIG. 8a is a plan view, FIG. 8b the side view of a version in which the keyboard is completely flat whereby the instrument can be used as a calculator when laid flat. The window shown in FIG. 8a shows, for example, which system of units has been entered in the calculator as fixed conversion factors. The drawing shows a number of systems of units although in practice the window 37 will display only the system of units selected with the selector key 38. Conversion to another system of units can be made by using key 38 and then the key '=' after the required system of units has appeared in the window. The connector 40 is the cable over which stored data can be transmitted, to a printer in particular, for storing the processed measurement results, but also to a computer system for further processing or to databank systems. The tracking wheel 41 will be described in detail under FIGS. 10a and 10b, with the understanding that several methods of interruption can be employed other than the opto-coupling and the electromagnetic generation to be described.

Figure 9A:
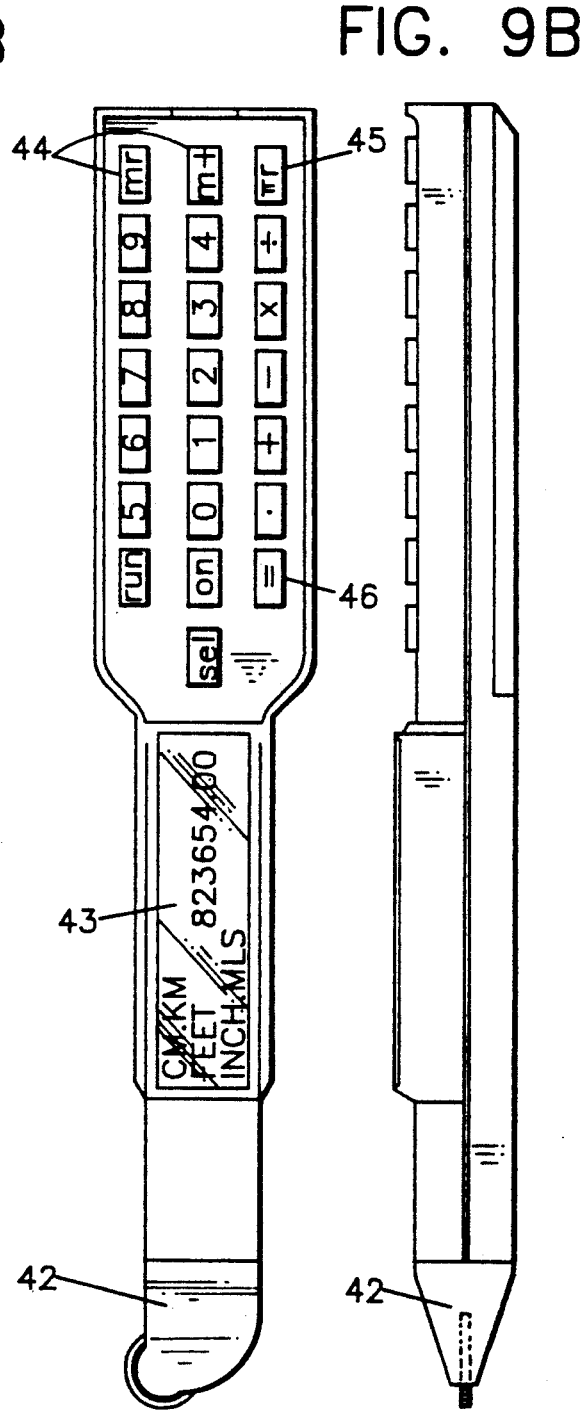
FIGS. 9a and 9b show a plan and side view of a version with a caster tracking wheel.
Figure 9B:
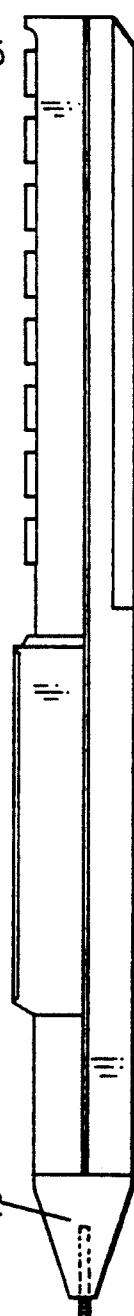

FIGS. 9a and 9b show the plan and side views of the instrument with a caster tracking wheel 42. It will be clear that this version in particular provides optimal facility for the user accurately to trace a web of straight and curved lines, whereby the window 43 remains clearly visible and the keyboard accessible. The keyboard in FIG. 9a like the one in FIG. 8a provides memory functions whereby it is possible to store results in between different measurements and to combine them with each other. The memory functions are controlled by keys 44. Key 45 indicates the use of the fixed conversion factor pi which allows the user to determine in a simple manner the area of a circle on the basis of the measurement of its radius, or to calculate the volume of a silo. Key 46 provides in the first place the result calculated by the calculator in the window. Entering '=' a second time when equipment is connected starts the transfer of the measured or calculated results shown in the window together with output of data in the memory. The caster tracking wheel will be discussed in detail under FIGS. 11a and b.

Figure 10A:
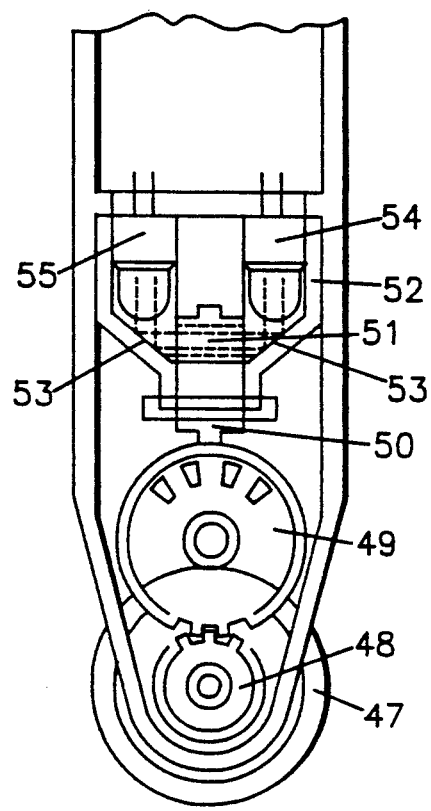
FIGS. 10a and 10b are cross-sections of the mechanics in front and side views.
Figure 10B:
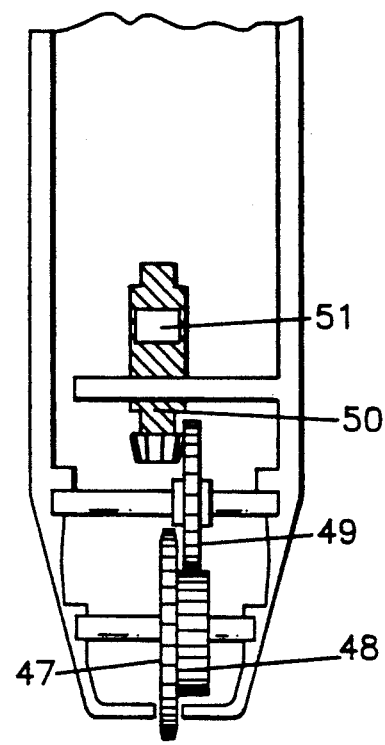

FIGS. 10a and 10b provide an example of the manner in which tracing is converted via tracking wheel 47, on which a gear wheel 48 transmits the rotation of tracking wheel 47 via a gear wheel 49 to the shaft 50. This shaft 50 protrudes into a reflector housing 52 and has at one end gear teeth for obtaining from gear wheel 49 a rotary motion, and at the other end an aperture 51 diametrically through the shaft 50, whereby when the shaft 50 rotates it alternately opens and closes a hollow space in the reflector housing 52. On the interior surface of the reflector housing 52 are two surfaces 53 which serve to reflect light signals in a selected direction. It is thus possible for a light signal from a light-generating element 54, an LED for example, to be directed by reflection through the aperture 51, whereby rotation of the shaft 50 by, for example, 90° closes the hollow space in the reflector housing 52. As soon as shaft 50 rotates a further 90° the aperture 51 opens for transmission of the light signal from element 54, and the light signal can be received via reflecting surface 53 by a receiving element 55, which can be, for example, a phototransistor. The manner in which the transmitting element 54 and the receiving element 55 are located with respect to each other and to the interruption-generating shaft 50 offers a number of specific advantage which greatly contribute to meeting the requirements to be placed on the instrument, such as the proportions and volume and weight of the power supply. This creates an opto-coupling with the smallest-possible dimensions of the opto-coupling working surfaces, since the elements 54 and 55 need not be mounted "facing" each other in which case their length, greater than their diameter, would create a relatively thick opto-coupling. In addition, there is a "dark environment" within the reflector housing 52 whereby even with a low current consumption a light signal is generated strong enough to attain the switching level of element 55, whereby a relatively small power supply, button cells for example, will provide sufficient power for the opto-coupling as well as the calculator and a display window. In addition the reflector housing provides good protection against external radiation, and protects the elements against dirt. Another example of interruption is a version on the basis of FIGS. 10a and 10b in which the elements 54 and 55 together with the housing 52 are replaced by, for example, an electromagnetic generator and in which a permanent magnet is mounted in the aperture 51 whereby at every rotation of shaft 50 an electrical signal is generated for the calculator.

Figure 11A:
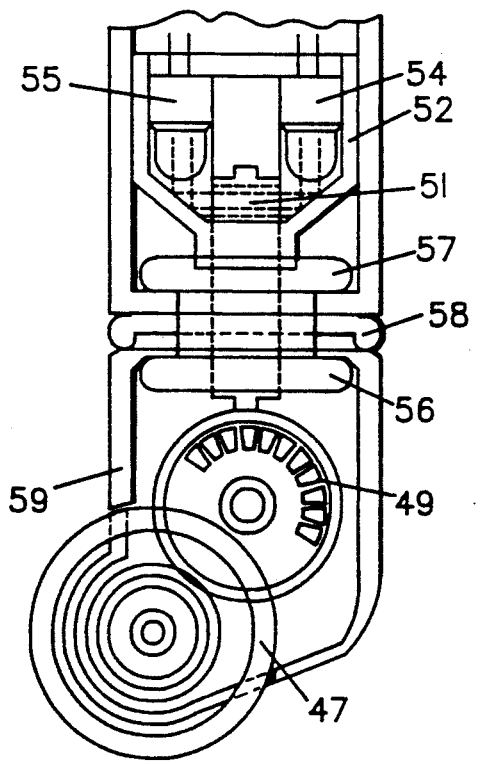
FIGS. 11a and 11b are cross-sections of the caster wheel with part front and side views.
Figure 11B:
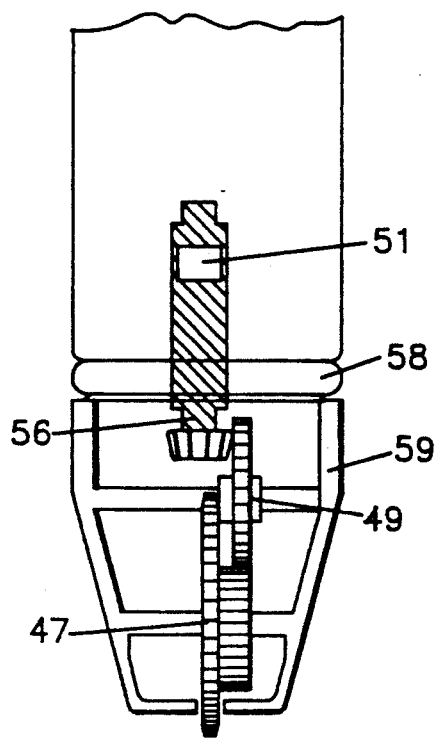

FIGS. 11a and 11b show in general line the same interruption technique as in FIGS. 10a and 10b. In this case, however, it concerns the caster movement of the tracking wheel with respect to the housing, although the castering part forms, both constructionally and functionally, such an essential part of the whole instrument that we are of the opinion that we can speak of a single instrument housing. The castering part 59 rotates around a connecting tube 57 in which shaft 56 rotates, whereby the spacer ring 58 maintains the caster in the correct position with respect to the instrument proper, absorbs exterior forces and provides sealing against dust and moisture. Several interruption techniques can be applied in a given solution to the castering tracking wheel described here.

Thus, variations in the calculating equipment described in this application are possible whereby another arithmetical program can be envisaged. Nonetheless these variations are also considered to fall within the scope of this invention.

We claim:

1. A measuring and calculating instrument comprising: a housing substantially in the shape of a writing instrument, a rotatable measuring wheel mounted on a wheel axle located on said housing with which lines on one, two, or three-dimensional objects can be followed, a conversion means for converting revolutions of said measuring wheel into a series of electrical pulses representing a distance being covered by said measuring wheel, a calculator means for processing said pulses, a display means for displaying the output of said calculator means, selector means for controlling said calculator means, a power supply, transmission means for transmitting the rotation of said measuring wheel to said conversion means, said transmission means disposed in a direction substantially perpendicular to the axis of said wheel axle of said measuring wheel, said transmission means rotatable about an axis substantially perpendicular to the axis of said wheel axle of said measuring wheel, said transmission means comprising a shaft having a first end and an apertured second end, said first end coupled to said measuring wheel by a mechanical transmission and said apertured second end located within said conversion means, said conversion means comprising a hollow chamber having a light source and an opto-electronic device disposed therein for reading angular positions of said shaft.

2. The measuring and calculating instrument of claim 1, further comprising a castering means in communication with said measuring wheel, said castering means and said measuring wheel rotatable about an axis substantially perpendicular to the axis of said wheel axle of said measuring wheel.

3. A measuring and calculating instrument comprising: a housing, a rotatable measuring wheel mounted on a wheel axle located on said housing with which lines on one, two, or three-dimensional objects can be followed, a conversion means for converting revolutions of said measuring wheel into a series of electrical pulses representing a distance being covered by said measuring wheel, a calculator means for processing said pulses, display means for displaying the output of said calculator means, selector means for controlling said calculator means, a power supply, a castering means in communication with said measuring wheel, said castering means and said measuring wheel rotatable about an axis substantially perpendicular to the axis of said wheel axle of said measuring wheel.

4. A measuring and calculating instrument comprising: a housing, a rotatable measuring wheel mounted on a wheel axle located on said housing with which lines on one, two, or three-dimensional objects can be followed, magnetic material attached in discrete units at predetermined intervals on said measuring wheel, a conversion means for converting revolutions of said magnetic material into a series of electrical pulses representing a distance being covered by said measuring wheel, a calculator means for processing said pulses, display means for displaying the output of said calculator means, selector means for controlling said calculator means, a power supply, a castering means in communication with said measuring wheel, said castering means and said measuring wheel rotatable about an axis substantially perpendicular to the axis of said wheel axle of said measuring wheel.

* * * * *